United States Patent
Brown et al.

(10) Patent No.: US 10,987,809 B2
(45) Date of Patent: Apr. 27, 2021

(54) ROTARY TOOL ADJUSTER FOR ROBOT WITH END OF ARM TOOL HAVING MULTIPLE TOOLS

(71) Applicant: T.A. Systems, Inc., Rochester Hills, MI (US)

(72) Inventors: Theodore Robert Brown, Birmingham, MI (US); Hendrik Stoltz, Milford, MI (US); Jan Tobiasz, Sterling Heights, MI (US)

(73) Assignee: T.A. Systems, Inc., Rochester Hills, MI (US)

( * ) Notice: Subject to any disclaimer, the term of this patent is extended or adjusted under 35 U.S.C. 154(b) by 0 days.

(21) Appl. No.: 17/010,494

(22) Filed: Sep. 2, 2020

(65) Prior Publication Data

US 2020/0398429 A1    Dec. 24, 2020

Related U.S. Application Data

(63) Continuation of application No. PCT/US2019/052573, filed on Oct. 24, 2019.

(Continued)

(51) Int. Cl.
*B25J 9/16* (2006.01)
*B25J 15/00* (2006.01)

(52) U.S. Cl.
CPC .......... *B25J 9/1669* (2013.01); *B25J 15/0019* (2013.01)

(58) Field of Classification Search
CPC .. B23K 26/0884; B23K 9/025; B23K 9/0288; B23K 26/032; B25J 17/0258;
(Continued)

(56) References Cited

U.S. PATENT DOCUMENTS 4,300,198 A * 11/1981 Davini ................ B05B 13/0431
                                                318/568.14
4,323,758 A    4/1982 Vokurka
(Continued)

FOREIGN PATENT DOCUMENTS

CN    103648731 A    3/2014
CN    105710524 A    6/2016
(Continued)

OTHER PUBLICATIONS

Zhang et al., Geometric error identification and compensation of CNC machine tool based on KGM181, 2015, IEEE, p. 2789-2794 (Year: 2015).*

(Continued)

*Primary Examiner* — McDieunel Marc (74) *Attorney, Agent, or Firm* — Carlson, Gaskey & Olds, P.C.

(57) ABSTRACT

A method of adjusting multiple tools on a common mount includes the interrogating first and second actual target positions on at least one workpiece. A variance is determined between the first and second actual target position and first and second theoretical target positions. At least one of the first and second tools is moved relative to the other of the first and second tools from the first and second theoretical target positions to a desired spacing respectively aligned with the first and second actual target positions.

19 Claims, 8 Drawing Sheets

Related U.S. Application Data (60) Provisional application No. 62/735,551, filed on Sep. 24, 2018.

(58) Field of Classification Search
CPC ...... B25J 19/0037; B25J 9/0081; B25J 9/041; B25J 13/084; B25J 15/0009; B25J 3/04; B25J 9/0006; B25J 9/1694; B25J 15/0019; B25J 9/1697; B25J 19/023; B25J 5/007; B25J 19/02; B25J 13/02; B25J 18/00; B25J 18/04; B05B 13/0431; B05B 13/0452; B23B 29/02; B23Q 1/48; B23Q 9/0021; B25B 7/02; B25B 7/10; B25B 7/123; G05B 19/42; G05B 19/427; G05B 2219/50391; Y10S 408/708; Y10S 901/01; Y10S 901/41; Y10S 901/46; Y10T 408/55; Y10T 408/675; Y10T 408/6779; Y10T 74/1515; Y10T 74/18312; Y10T 74/18528; Y10T 82/125; A61B 34/30; A61B 34/37; A61B 1/00149

See application file for complete search history.

(56) References Cited

U.S. PATENT DOCUMENTS

| | | | |
|---|---|---|---|
| 4,466,307 A | | 8/1984 | Kouno |
| 4,548,346 A * | | 10/1985 | Kraus ............... B23P 21/004 198/339.1 |
| 4,650,952 A * | | 3/1987 | Akeel ............... B23K 26/0884 219/121.74 |
| 4,902,868 A * | | 2/1990 | Slee ............... B23K 1/16 219/79 |
| 4,982,992 A * | | 1/1991 | Vu ............... B60J 3/0208 296/97.11 |
| RE34,597 E * | | 5/1994 | Akeel ............... B23K 26/0884 219/121.63 |
| 6,366,830 B2 | | 4/2002 | Bacchi et al. |
| 6,737,826 B2 | | 5/2004 | Gilchrist |
| 8,768,513 B2 | | 7/2014 | Cox et al. |
| 9,808,883 B2 | | 11/2017 | Ballough et al. |
| 2006/0291969 A1* | | 12/2006 | Koch ............... G05B 19/40937 409/132 |
| 2009/0212090 A1* | | 8/2009 | Hepp ............... B25J 9/0096 228/47.1 |
| 2010/0199742 A1* | | 8/2010 | Johnson ............... B21D 22/02 72/386 |
| 2011/0017710 A1 | | 1/2011 | Yasunaga et al. |
| 2011/0022216 A1* | | 1/2011 | Andersson ............... G05B 19/401 700/114 |
| 2012/0039699 A1 | | 2/2012 | Ward et al. |
| 2015/0119214 A1 | | 4/2015 | Sasaki |
| 2015/0160049 A1* | | 6/2015 | Oki ............... G01B 5/20 702/97 |
| 2018/0001484 A1 | | 1/2018 | Hirashima et al. |
| 2018/0101165 A1 | | 4/2018 | Kurahashi et al. |
| 2018/0169870 A1 | | 6/2018 | Nakayama |

FOREIGN PATENT DOCUMENTS

| | | |
|---|---|---|
| CN | 106687062 A | 5/2017 |
| CN | 107738029 A | 2/2018 |
| CN | 207072124 U | 3/2018 |
| CN | 107891609 A | 4/2018 |
| JP | H03251379 A | 11/1991 |
| JP | 2007122705 A | 5/2007 |
| JP | 2013188783 A | 9/2013 |
| JP | 2018512730 A | 5/2018 |
| KR | 20120051557 | 5/2012 |

OTHER PUBLICATIONS

Rao et al., Normal direction measurement based on 3D point cloud in robotic drilling, 2017, IEEE, p. 1182-1187 (Year: 2017).*
Tillen, Controlling workpiece accuracy, 1964, IEEE, p. 1-17 (Year: 1964).*
Khan et al., Control of Robot Arm PA-10 using Camera Vision, 2007, IEEE, p. 1-7 (Year: 2007).*
International Search Report and Written Opinion for International Application No. PCT/US2019/052573 dated May 12, 2020.

* cited by examiner

ROTARY TOOL ADJUSTER FOR ROBOT WITH END OF ARM TOOL HAVING MULTIPLE TOOLS

CROSS-REFERENCE TO RELATED APPLICATIONS

This application is a continuation of International Patent Application No. PCT/US2019/052573 filed on Sep. 24, 2019, which claims priority to U.S. Provisional Application No. 62/735,551 which was filed on Sep. 24, 2018. These applications are incorporated herein by reference.

BACKGROUND

This disclosure relates to an end of arm tool (EOAT) for a robot as well as the method and process used to program and control the same. The EOAT has multiple tools for use on multiple workpiece locations simultaneously.

One of the more challenging aspects in robot applications is the need for accurate and variable positioning of tooling on the robot EOAT in relation to the workpiece. The locations on the workpiece on which the tooling must be positioned during the automated operation can vary due to a number of factors, namely, that the actual positions these locations on the workpiece is not the same as the theoretical positions of these locations. In other words, the workpiece actual target positions are neither accurate nor precise nor consistent in its variability relative to each target within the same part (i.e. random inaccuracy in random directions).

There tends to be two kinds of variability: part-to-part production variability, and a more systemic or consistent variability with the mechanical factors that cause the workpiece and its target positions to be inconsistently off the theoretical positions. In addition to a user frame offset, a robot calibration process employs "teaching points" to correct for this variability.

This "teaching points" process positions the tool to the actual versus theoretical position of the workpiece target position. Typically the theoretical and the actual positions will vary, then a process to re-teach the robot to the actual position is performed. This process takes a long time, is very labor intensive, and often the technician doing the work does not have a favorable ergonomic access to visually see the target position.

Often in production some of the system variables change to make re-teaching necessary, requiring more labor and causing a long downtime. Some reasons that require re-teaching are, for example, a robot crash, a bent tool, a change in workpiece nesting, a permanent change in a workpiece, and a temperature of a workpiece.

During the production run, due to many possible variables the "actual" position of the point (target) will vary from the "taught" point. This variability could be caused by but not limited to; production changes, mold changes, upstream process changes, material changes, different materials in parts, heat, or cooling of the part, shrinkage, etc. These "actual points" (or targets) could move in any direction and may or may not be consistent in its moving (or floating) relative from target to target (e.g., one target could move 1 mm to the "north" and the target right next to it could move 2 mm to the "southeast").

SUMMARY OF THE INVENTION

In one exemplary embodiment, a method of adjusting multiple tools on a common mount includes the interrogating first and second actual target positions on at least one workpiece. A variance is determined between the first and second actual target position and first and second theoretical target positions. At least one of the first and second tools is moved relative to the other of the first and second tools from the first and second theoretical target positions to a desired spacing respectively aligned with the first and second actual target positions.

In a further embodiment of the above, the first and second actual target positions are arranged on the same workpiece.

In a further embodiment of any of the above, the first and second actual target positions are plastic weld points.

In a further embodiment of any of the above, the moving step includes simultaneously moving the first and second tools relative to one another.

In a further embodiment of any of the above, the moving step is performed by rotating the tools about independent axes.

In a further embodiment of any of the above, the interrogating step includes sensing each of the first and second actual target positions in both an x-direction and a y-direction.

In a further embodiment of any of the above, the moving step includes simultaneously rotating the first and second tools in an x-y plane to the desired spacing. Pivotal axes of the first and second tools are parallel to first and second tool axes along which the first and second tools translate.

In a further embodiment of any of the above, a distance between the first and second theoretical target positions corresponds to the y-direction. The moving step includes dividing the sum of the variance by two to provide the desired spacing.

In a further embodiment of any of the above, the method includes the step of adjusting an x-position of the first and second tools based upon the moving step.

In a further embodiment of any of the above, the determining step includes visually detecting the first and second actual target positions.

In a further embodiment of any of the above, the visually detecting step includes sensing the first and second actual target positions respectively with first and second cameras respectively associated with the first and second tools.

In a further embodiment of any of the above, the first and second cameras move in unison with the first and second tools during the moving step.

In a further embodiment of any of the above, the determining step includes calculating a hypotenuse between each of the first and second cameras and its associated first and second actual target positions. The hypotenuse corresponds to a focal direction of a camera. A first leg corresponds to a distance between the camera and a z-direction of a tool. A second leg corresponds to a second distance along the z-direction.

In a further embodiment of any of the above, the method includes the step of performing an operation on the workpiece with the first and second tools subsequent to performing the moving step. The step of unloading the workpiece and then loading a new workpiece follows the performing step. The step of repeating the interrogating, determining and simultaneously moving steps with the new workpiece.

In another exemplary embodiment, an end of arm tool assembly includes a frame supported on a mount. First and second arms are pivotally attached to the frame. First and second tools are respectively secured to the first and second arms. First and second cameras are operatively second to the first and second arms. The first and second cameras are configured to detect respectively first and second actual target positions of at least one workpiece and respectively associated with the first and second tools. A drive assembly is connected to the first and second arms. The drive assembly is configured to rotate at least one of the first and second arms from a current spacing associated with first and second theoretical target positions to a desired spacing that corresponds to the first and second actual target positions. A controller is in communication with the first and second cameras and the drive assembly. The controller is configured to determine a variance between the first and second actual target position and first and second theoretical target positions and command the first and second tools to the desired spacing based upon the variance.

In a further embodiment of any of the above, the drive assembly includes a motor that has a drive pulley and first and second driven pulleys respectively associated with the first and second arms. A belt rotationally couples the drive pulley and the first and second driven pulleys.

In a further embodiment of any of the above, first and second actuators are provided respectively on the first and second arms and respectively support the first and second tools. The first and second actuators are configured to move the first and second tools in a z-direction.

In a further embodiment of any of the above, a slide assembly is provided between the first and second arms and its respective one of the first and second tools.

In a further embodiment of any of the above, the controller is configure to determine the variance by calculating a hypotenuse between each of the first and second cameras and its associated first and second actual target positions. The hypotenuse corresponds to a focal direction of a camera. A first leg corresponds to a distance between the camera and a z-direction of a tool. A second leg corresponds to a second distance along the z-direction.

In a further embodiment of any of the above, the end of arm tool assembly is mounted to a multi-axis robot. The controller is in communication with the robot. The controller is configured to command the drive assembly to obtain the desired spacing in the y-direction. The controller is configured to command the robot to a desired position in the x-direction based upon the desired spacing.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
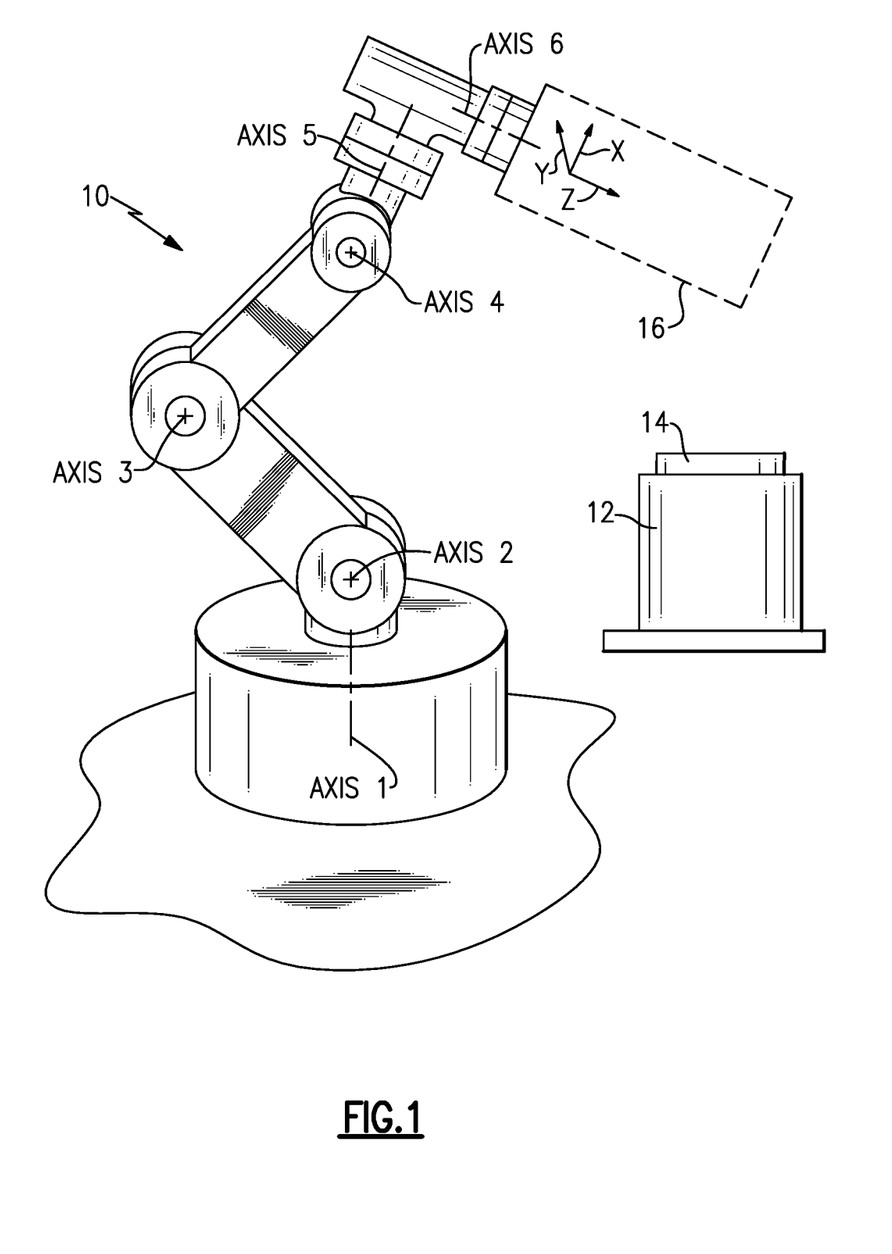
FIG. 1 is a schematic view of a multi-axis robot with an end of arm tool (EOAT) with multiple tools.

A multi-axis robot 10 is schematically shown in FIG. 1. In the example, the robot 10 is illustrated as having six axes, although fewer or greater number of axes may be used. An end of arm tool (EOAT) 16 is mounted at one end of the robot 10 and is arranged in proximity to a workpiece 14 mounted in a fixture 12. In the example, the workpiece 14 has multiple features (also referenced as targets or points) that are spaced apart from one another. The EOAT 16 uses multiple tools so that the multiple features can be worked upon by the tools simultaneously. Although the EOAT 16 is shown mounted to a robot 10, the EOAT 16 may also be used on stationary fixtures.

Figure 2A:
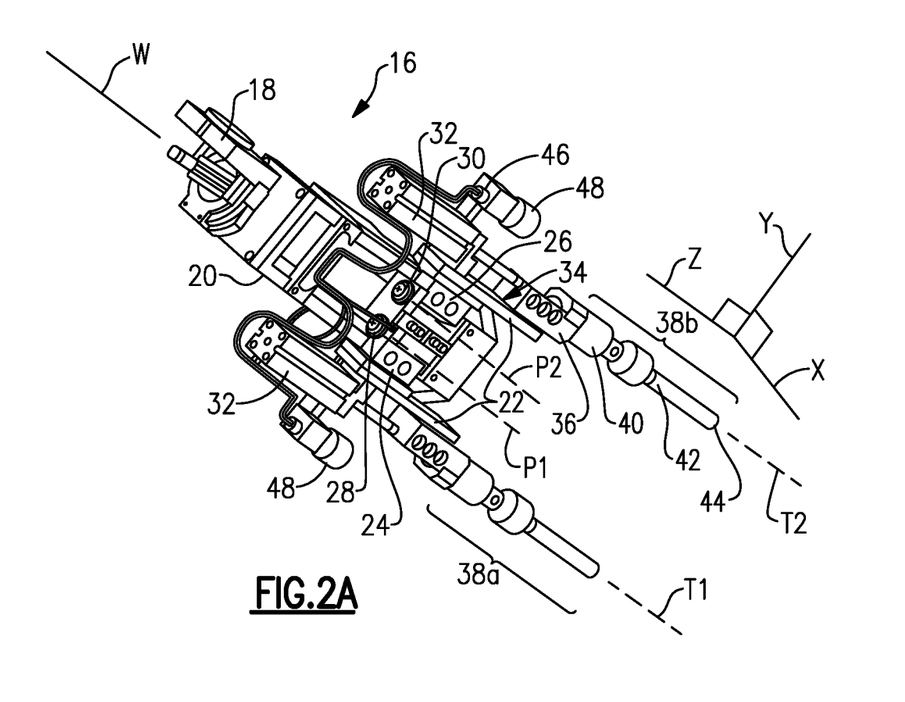
FIGS. 2A and 2B are perspective views of the EOAT with first and second tools in first and second positions.
Figure 2B:
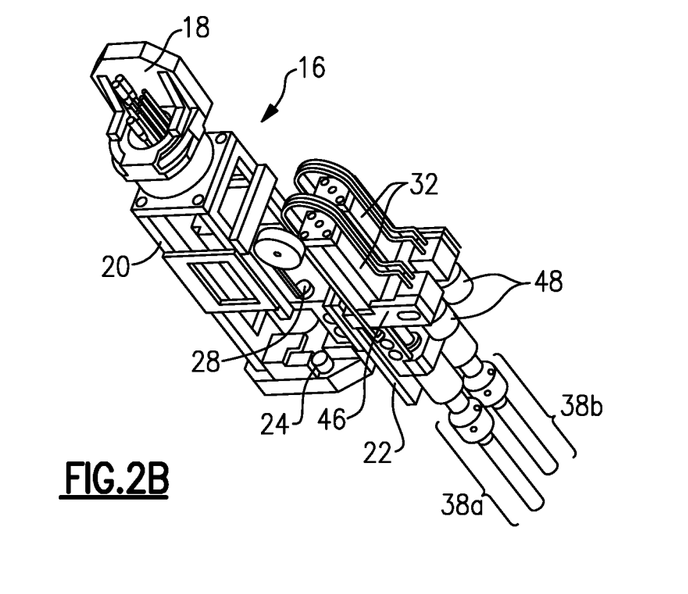

Referring to FIGS. 2A and 2B, the EOAT 16 includes a mount 18 that secures a frame 20 to the robot 10. First and second arms 24, 26 are pivotally secured to the frame 20 at first and second pivots 28, 30 respectively for rotational movement. Each of the first and second arms 24, 26 include a base 22 that provides a slide 34. An actuator 32 is mounted to a block 36 that is slidably supported for translation along the slide 34 in a z-direction. The slide 34 and block 36 may be configured differently, if desired. Other applications may not incorporate the slide assembly. For example, screw motor actuators may be used and may incorporate a spring load in the z-direction. The actuator 32 may be a pneumatic actuator, electric motor, or other suitable actuator for the operation.

In the example, an ultrasonic welder provides a tool (38a and 38b, individually or collectively referred to as 38) supported on each block 36. One typical application is ultrasonic welding of plastics. Other tools may be used, such as drills, taps, screw run-downs, clipping, pick and place, liquid dispensing, heating or other machining or welding implements. Moreover, more than two tools may be used. The ultrasonic welder includes a sonotrode 42 at one end having a tip 44 that engages the workpiece 14. A generator 40 excites the sonotrode 42 at a desired frequency, which generates heat in the workpiece sufficient for welding.

The "wrist" of the robot 10 provides an axis W, which corresponds to the sixth axis in the example. The pivot points 28, 30 respectively provide axes P1, P2, which are spaced apart from one another and offset a distance from the axis W to which axes P1 and P2 are parallel. The tools 38a and 38b respectively operate along axes T1, T2, which are parallel to and offset from axes P1, P2 and axis W. The offset between the pivot axes P1, P2 and the tool axes T1, T2 enables the EOAT 16 to access difficult to reach points on the workpiece.

Figure 4A:
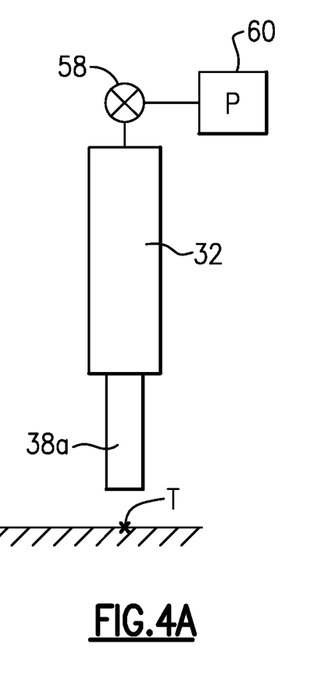
FIGS. 4A and 4B are schematic views of one of the first and second tools translated between retracted and extended positions in relation to a workpiece.
Figure 4B:
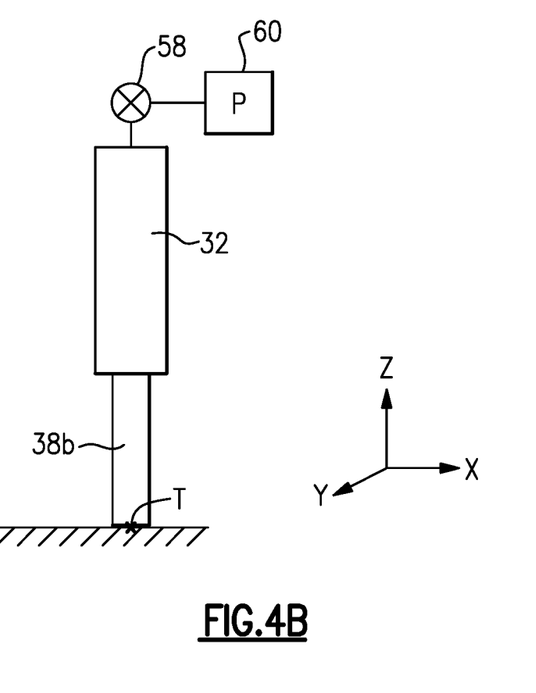

The actuator 32 translates the sonotrode 42 between retracted and extended positions (FIGS. 4A and 4B) in the z-direction to selectively engage the workpiece 14 and apply a force thereto. In the case of a pneumatic cylinder 32, the tool 38 is moved with respect to a target T on the workpiece by selectively regulating the flow of pressurized fluid from a fluid source 60 through a control valve 58.

Returning to FIGS. 2A and 2B, a camera 48 is operatively mounted to each of the first and second arms 24, 26 via a bracket 46. Each camera 48 is positioned to obtain a field of view (first and second fields of view 72, 74 in FIG. 6) encompassing the feature on the workpiece to be welded by the tool associated with the given camera. The cameras 48 may provide 2D vision for arrangements in which no adjustment is needed in the z-direction (e.g., ultrasonic welding using an actuator advance), or the cameras 48 may provide 3D vision for arrangements where z-direction adjustment is desired, such as for clipping operations. For workpieces that provide targets in close proximity to one another, it is possible that one camera may be used if the multiple targets are in its field of view.

Any suitable coordinate system may be used for the robot 10 and its EOAT 16. One example coordinate system is where the tool axis corresponds to the z-direction, and the x-y plane is perpendicular to the z-axis at the wrist of the EOAT 16.

Figure 3:
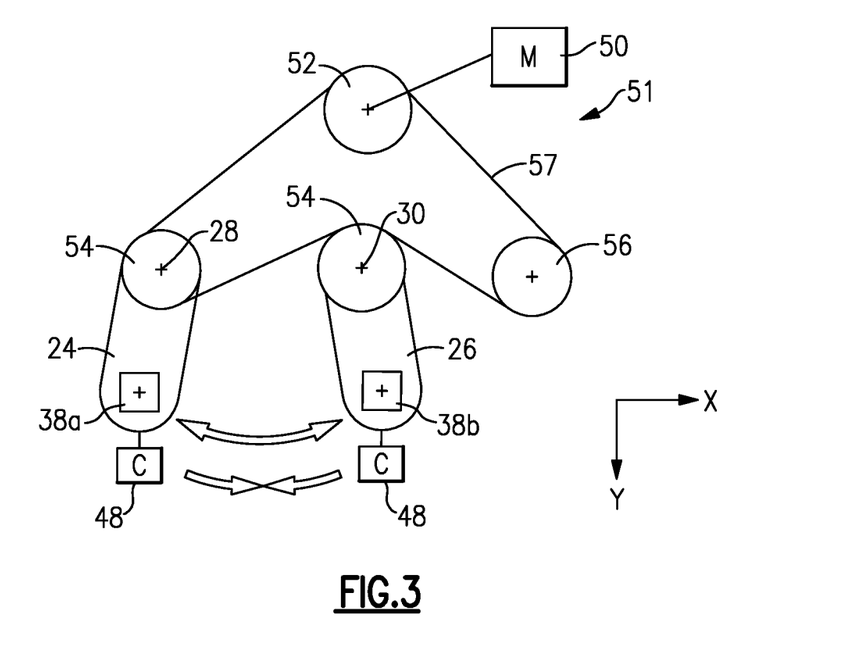
FIG. 3 is a schematic view of an example drive assembly for rotating the first and second tools relative to one another.

Referring to FIGS. 2A-3, a drive assembly 51 is configured to rotate the first and second arms 24, 26 about the first and second pivots 28, 30, which enables the tools 38 to be quickly positioned with respect to one another during the welding operation. In the example, a motor 50 rotationally drives a drive pulley 52 that is coupled to driven pulleys 54 and an idler pulley 56 via a belt 57. Each driven pulleys 54 is secured to a shaft providing a pivot and that is affixed to its respective arm. The tools 38 are simultaneously rotated relative to one another about the first and second pivots 28, 30 in the x-y plane. Other types of drive assemblies may be used, for example, a gear drive or a chain drive. If desired, a drive assembly may be provided in which one tool is fixed and one or more additional tools pivots as described above. In such a configuration, the motor may drive the one rotatable tool directly.

Figure 5:
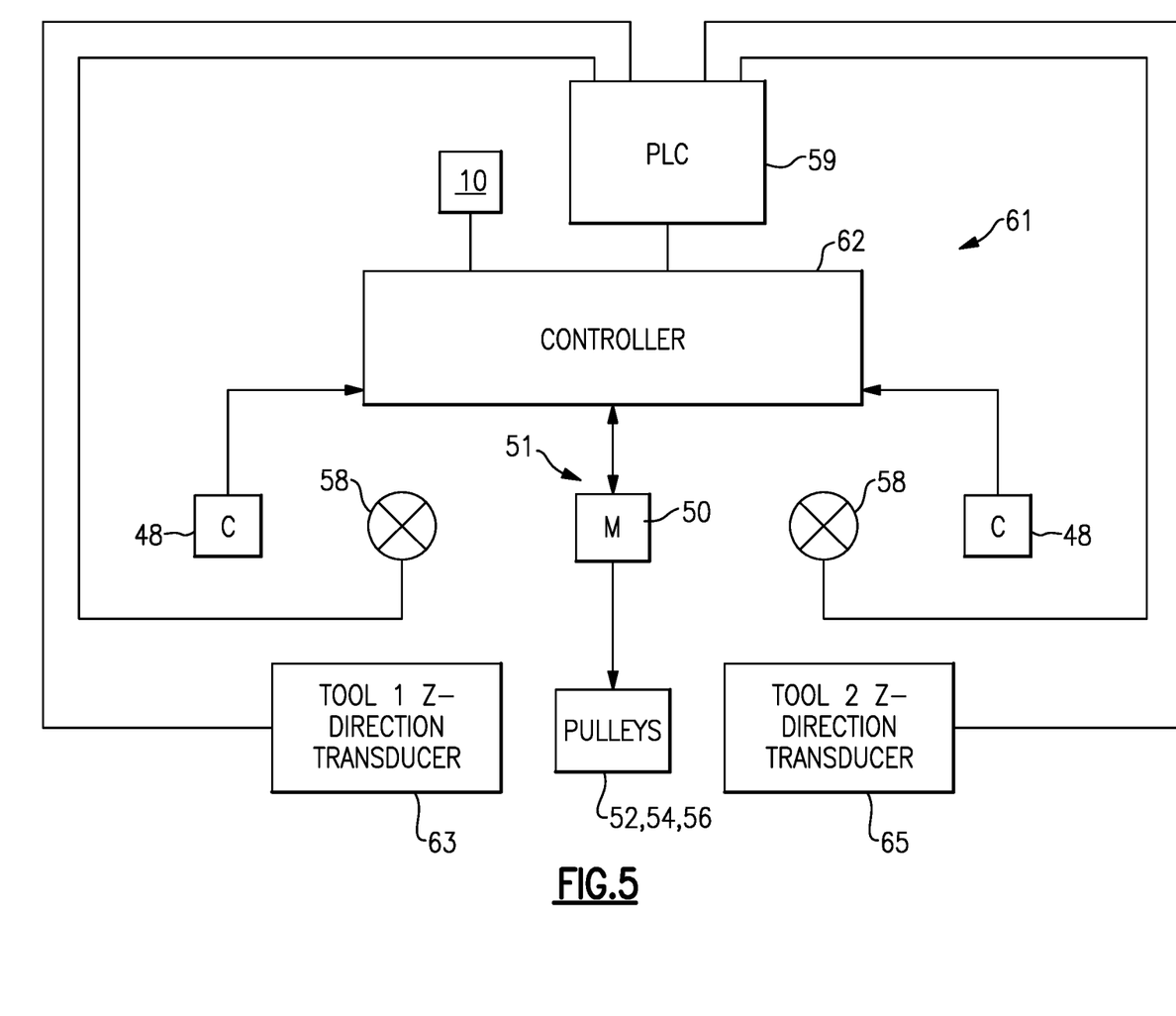
FIG. 5 is a schematic view of a control system for the robot and the EOAT.

A control system 61 is schematically shown in FIG. 5. The system 61 includes a controller 62 that may be used to control the robot 10 and, if desired, the EOAT 16 as well if the controller 62 is programmed to control a $7^{th}$ robot axis, for example. If desired, the same controller, a separate controller, or a PLC 59 may be used to control the EOAT 16. In the example, the PLC 59 is configured to command the control valve 58 associated with each of the tools 38, which controls the position of the tool in the z-direction to selectively engage the workpiece 14. First and second transducers 63, 65 may be provided for each of the actuators 32 to provide feedback to the PLC 59 of the tool's positioned in the z-direction. Controller 62 commands the motor 50 of the drive assembly 51 which positions the first and second arms 24, 26 in the x-y plane by rotationally driving the pulleys 52, 54, 56. The cameras 48 provide the field of view to the controller 62, which enables the controller 62 to determine the actual position of the targets on the workpiece for positioning the tools.

Figure 6:
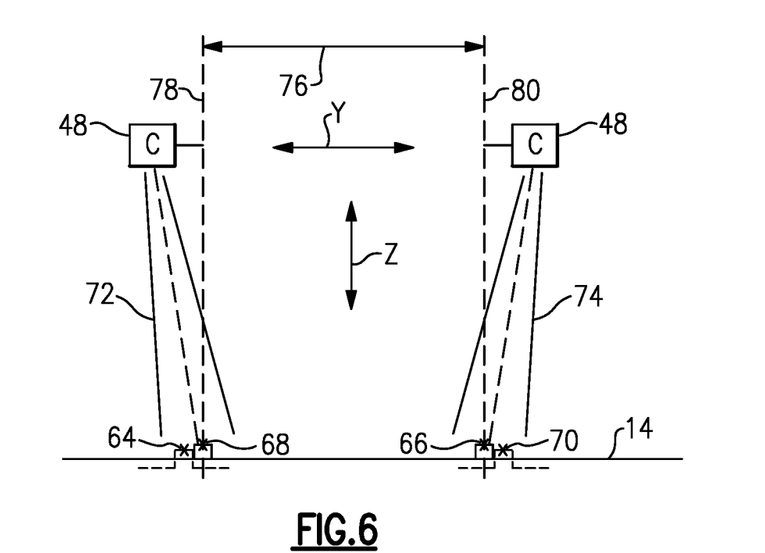
FIG. 6 is a schematic view of a targeting system for the first and second tools in relation to first and second targets of the workpiece.

The controller 62 is programmed to initially position the first and second tools 38a, 38b to desired positions in alignment with first and second theoretical target positions 64, 66 (dashed lines) on the workpiece 14, as shown in FIG. 6. The theoretical target position may correspond to a "master" or ideal target independent of the particular fixture or workpiece. The theoretical target may additionally or alternatively include a "production" target, which is particular to fixture and/or workpiece combination. As described above, these first and second theoretical target positions 64, 66 may vary from the first and second actual target positions 68, 70 (solid lines) of the features on the workpiece 14 that need to be welded. Thus, the first and second tools 38a, 38b, particularly their tips 44, may not be properly positioned with respect to the features on the workpiece 14. Instead of using a conventional teaching process in which the first and second tools 38a, 38b are physically engaged with or touch the features on the workpiece 14 to "find" their actual positions, a visual targeting system is employed to correct or adjust each tool position and align the tools with the first and second actual target positions 68, 70 corresponding to the features to be welded.

A method of adjusting the first and second tools 38a, 38b includes interrogating first and second actual target positions 68, 70 on one or more workpieces. A variance between the first and second actual target positions 68, 70 and the first and second theoretical target positions 64, 66 is determined. This interrogating may include sensing each of the first and second actual target positions 68, 70 within the first and second fields of view 72, 74 of the cameras 48 to detect their coordinates. Since the position of each camera 48 is fixed with respect to the first and second longitudinal axes 78, 80 of its respective tool 38a, 38b, the distances of this triangular geometry may be used to determine the x, y, z coordinates of the first and second actual target positions 68, 70.

Figure 7A:
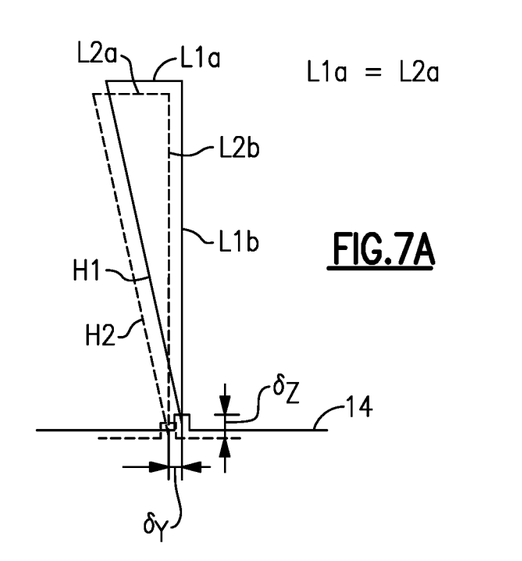
FIG. 7A schematically illustrates geometric relationships between the targeting system of an actual target position in relation to a theoretical target position from a 3-dimensional perspective.

In one example, the controller 62 calculates a hypotenuse between each of the first and second cameras 48 and its associated first and second actual target position 68, 70. Referring to FIG. 7A, the hypotenuse is coaxial with the focal direction of the camera 6 corresponds to the distance between the camera 48 and the actual target position. A first leg of this triangular geometric relationship corresponds to a first distance between the camera and the z-direction or longitudinal axis of the tool 38, and a second leg corresponds to a second distance along the z-direction from the camera 48 to the actual target position.

The geometric relationship for the actual target position (solid lines) is shown as H1, L1a, L1b, and the geometric relationship for the theoretical target position (dashed lines) is shown as H2, L2a, L2b. Any variance in the y-direction corresponds to an offset 6y, and any variance in the z-direction corresponds to a offset 6z. An offset 6x in the x-direction is also determined. If 2D vision is used where the z-direction position is not needed (e.g., ultrasonic welding), the described method of triangulation may not be needed as the cameras 48 simply detected the actual target position in the x-y plane.

Figure 7B:
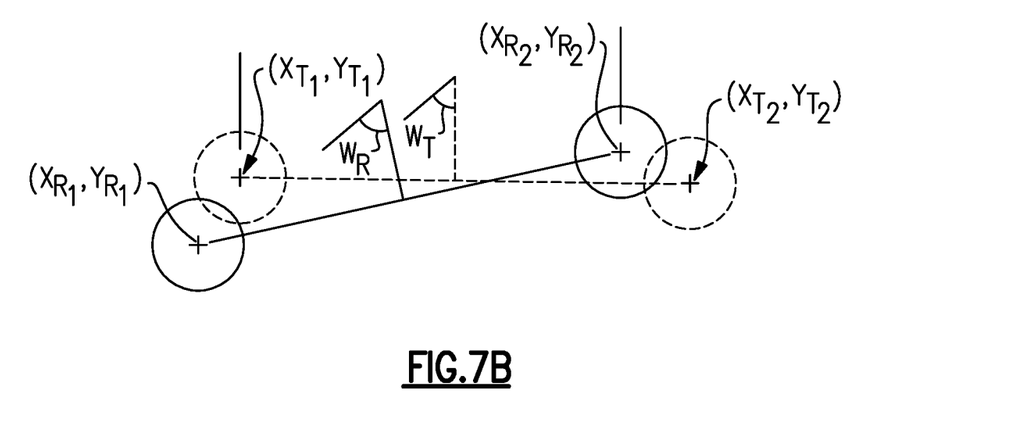
FIG. 7B schematically illustrates geometric relationships between the targeting system of an actual target position in relation to a theoretical target position from a 2-dimensional perspective.

If desired, the error compensation may be provided from a simplified 2-dimension perspective as shown in FIG. 7B. X, Y are the X-, Y-positions, T is the theoretical value, and R is the actual value. In the schematic, for the actual position, $X_{R1}$, $F_{R1}$ is the "leader" position of the first tool 38a, and $X_{R2}$, $Y_{R2}$ is the "follower" position for the second tool 38b. For the theoretical position, $X_{T1}$, $Y_{T1}$ is the "leader" position of the first tool 38a, and $X_{T2}$, $Y_{T2}$ is the "follower" position for the second tool 38b. $W_T$ and $W_R$ respectively are the theoretical and actual angular targets for tools 38a, 38b via the drive assembly 51 (e.g., $7^{th}$ axis as shown in FIGS. 1 and 2A), which moves the tools angularly simultaneously relative to one another. All of these coordinates relate back to the "world" coordinate system of the robot, for example. Accordingly, the desired change in linear distance (from the actual, R, to theoretical, T) is achieved by changing the rotational angle with the drive assembly 51 according to:

$$(X_{T1}, Y_{T1})(X_{T2}, Y_{T2}) - (X_{R1}, Y_{R1})(X_{R2}, Y_{R2}) \quad \text{(Equation 1)}$$

Figure 8A:
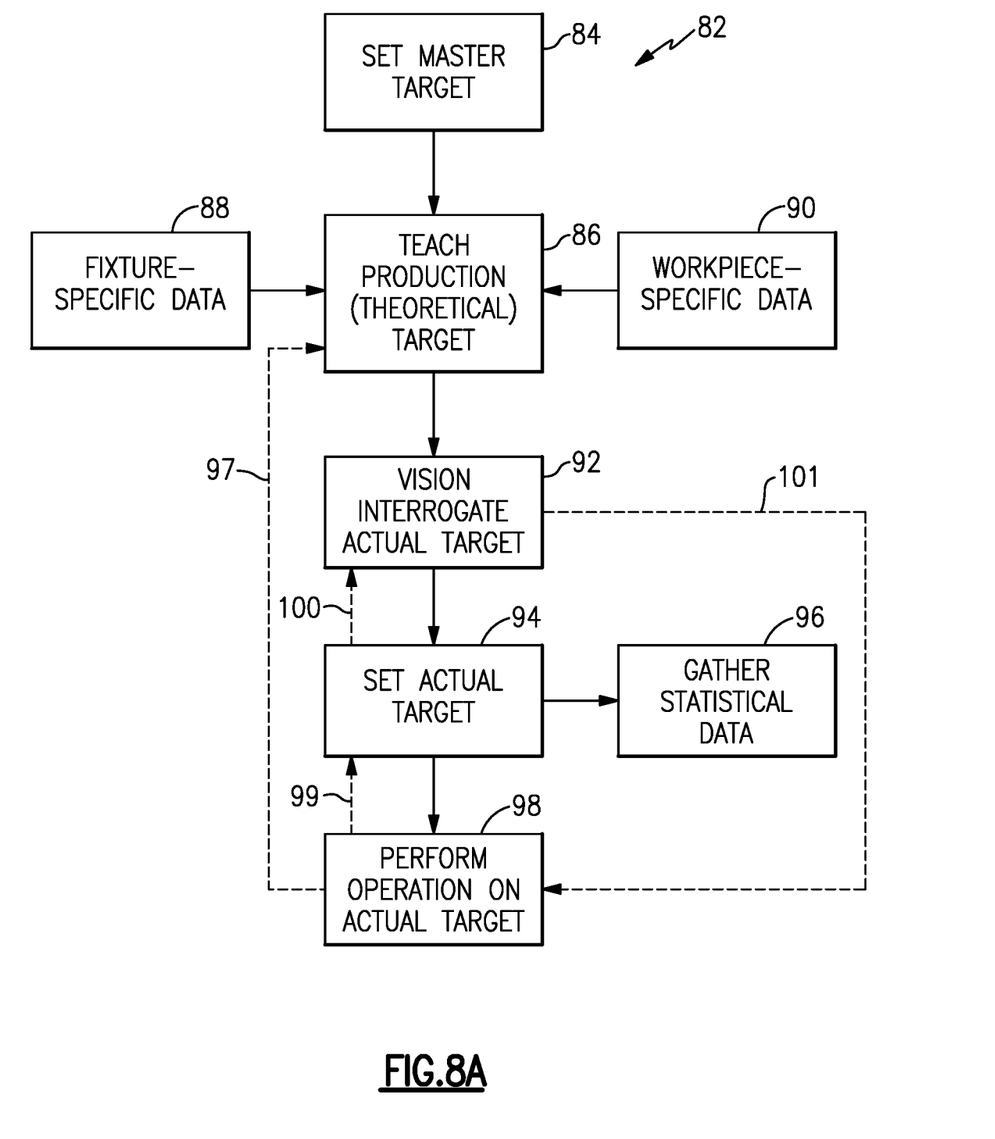
FIG. 8A is a flow chart illustrating the error compensation method for the disclosed robotic system.

An example error compensation method 82 for the system is shown in FIG. 8A. The system is programmed to a master target for each point on which the tool operates (block 84); however, there is production variability for every cycle in varying degrees. In a production autocycle the apparatus will move to the working position for a given fixture/workpiece combination (blocks 88, 90), as indicated at block 86. The "taught" target position is compared to the "actual" target position via vision interrogation (block 92), and both tools (e.g., dual weld horns) are adjusted to the actual target position (block 94). The tools then perform operations on the workpiece at their actual positions (block 98). This approach results in a superior weld, by adapting for every cycle to the actual target position, eliminating the weld being off center when the taught, theoretical position is different than the actual target position.

The production autocycle of the actual targeting of the point can produce a number of options for the autocycle modes. 1) for all new cycles the tool can return to the "taught" position and vision interrogating repeating the above process (dashed line 97), or 2) auto adjust to go to the last "actual" target position (dashed line 99) from the previous cycle (or previous cycle on that part variant if the machine runs multiple product variants), then interrogate via vision (dashed line 100), weld (dashed line 101), save this position to be used next time this target data is needed, or 3) auto adjust to go to the "most likely" location of the weld by taking a historical positional average and mathematically determining the "most likely" location of the target position. As long as the actual targets are in the field of view of the cameras 48, the system 61 can adjust the tools 38a, 38b to their desired operational positions.

The machine will have the capability to keep historical, statistical data (block 96) such as all actual targets from the distance of the taught point. All data records will be kept with a time stamp. Also, if there are any variable nests (i.e., fixture) used, then the nest type and unique ID stored with the data record. Also, in this record will be any unique product identifier either from bar code scan, passed on from previous process, or via Radio Frequency tag. This historical information will allow for the ability to offer to the customer statistical information such as but not limited to; any product tolerance trending over time, plots of actual target vs. production target vs. master target, identify performance of actual target vs. production target vs. master target for all parts run through the line. The customer can be notified of trends and when it appears the product process is out of control.

Figure 8B:
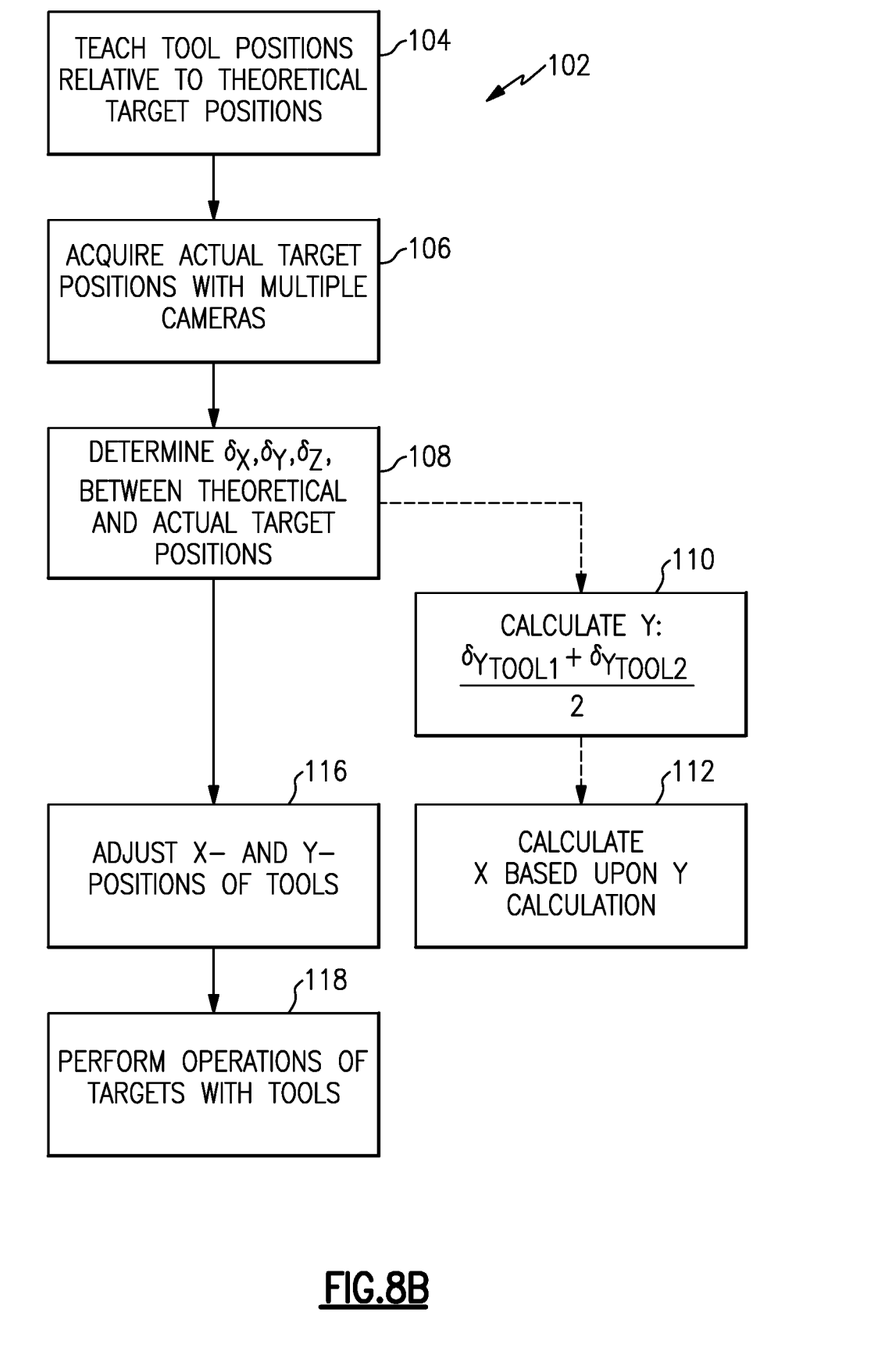
FIG. 8B is a flow chart depicting an example control algorithm for the EOAT targeting system.

Referring to FIG. 8B, an example position targeting method 102 for the tools is shown by teaching the actual tool positions relative to the theoretical tool positions (block 104). The actual target positions are acquired with the multiple cameras 48 (block 106), and the variance (δx, δy, δz) between the actual target positions and the theoretical target positions for each workpiece feature is determined (block 108). Where the tools 38a, 38b are provide in the y-direction, the desired spacing is calculated according to the relationship (block 90)

$$\frac{\delta yTool1 + \delta yTool2}{2},$$

since both tools 38a, 38b move in unison with one another. Other calculations may be used to reduce the error. The rotation of the first and second arms 24, 26 necessarily effects the position of the tools 38a, 38b in the x-direction as well, so the variance in the x-direction is calculated based upon the adjustment in the y-direction (block 112).

Any differences between the actual target position and the theoretical target positions programmed into the controller 62 as the initial position for the tools may then be adjusted (block 116). This is achieved by the controller 62 commanding the first and second arms 24, 26 via drive assembly 51 to the desired spacing 76, which corresponds to spacing of longitudinal axes 78, 80 of the tools 38a, 38b in the y-direction, as shown in FIG. 6. Thus, the controller 62 commands the robot 10 to then position the tools 38a, 38b in the desired x position. With the tools 38a, 38b in the fully aligned positions, operations may be performed on the workpiece features, e.g., weld stakes (block 118).

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A method of adjusting multiple tools on a common mount, the method comprising:
    interrogating first and second actual target positions on at least one workpiece using a controller;
    determining a variance between the first and second actual target position and first and second theoretical target positions using the controller; and
    moving at least one of the first and second tools relative to the other of the first and second tools from the first and second theoretical target positions to a desired spacing respectively aligned with the first and second actual target positions, wherein the moving step includes simultaneously rotating the first and second tools in an x-y plane to the desired spacing, pivotal axes of the first and second tools parallel to first and second tool axes along which the first and second tools translate.

2. The method of claim 1, wherein the first and second actual target positions are arranged on the same workpiece.

3. The method of claim 1, wherein the first and second actual target positions are plastic weld points.

4. The method of claim 1, wherein the moving step includes simultaneously moving the first and second tools relative to one another.

5. The method of claim 4, wherein the moving step is performed by rotating the tools about independent axes.

6. The method of claim 4, wherein the interrogating step includes sensing each of the first and second actual target positions in both an x-direction and a y-direction.

7. The method of claim 1, wherein a distance between the first and second theoretical target positions corresponds to the y-direction, and the moving step includes dividing the sum of the variance by two to provide the desired spacing.

8. The method of claim 7, comprising the step of adjusting an x-position of the first and second tools based upon the moving step.

9. The method of claim 1, comprising the step of performing an operation on the workpiece with the first and second tools subsequent to performing the moving step, the step of unloading the workpiece and then loading a new workpiece following the performing step, and the step of repeating the interrogating, determining and simultaneously moving steps with the new workpiece.

10. The method of claim 1 wherein the variance between the first and second actual target position and first and second theoretical target positions includes the spatial difference between the first actual target position and the first theoretical target position and the spatial difference between the second actual target position and the second theoretical target position.

11. A method of adjusting multiple tools on a common mount, the method comprising:
   interrogating first and second actual target positions on at least one workpiece using a controller;
   determining a variance between the first and second actual target position and first and second theoretical target positions using the controller, wherein the determining step includes visually detecting the first and second actual target positions, wherein the visually detecting step includes sensing the first and second actual target positions respectively with first and second cameras respectively associated with the first and second tools, the first and second camera being communicatively coupled to the controller; and
   moving at least one of the first and second tools relative to the other of the first and second tools from the first and second theoretical target positions to a desired spacing respectively aligned with the first and second actual target positions.

12. The method of claim 11, wherein the first and second cameras move in unison with the first and second tools during the moving step.

13. The method of claim 12, wherein the determining step includes calculating a hypotenuse between each of the first and second cameras and its associated first and second actual target positions, wherein the hypotenuse corresponds to a focal direction of a camera, a first leg corresponds to a distance between the camera and a z-direction of a tool, and a second leg corresponds to a second distance along the z-direction.

14. An end of arm tool assembly, comprising:
   a frame supported on a mount;
   first and second arms pivotally attached to the frame;
   first and second tools respectively secured to the first and second arms;
   first and second cameras operatively second to the first and second arms, the first and second cameras configured to detect respectively first and second actual target positions of at least one workpiece and respectively associated with the first and second tools;
   a drive assembly connected to the first and second arms, the drive assembly configured to rotate at least one of the first and second arms from a current spacing associated with first and second theoretical target positions to a desired spacing corresponding to the first and second actual target positions; and
   a controller in communication with the first and second cameras and the drive assembly, the controller configured to determine a variance between the first and second actual target position and first and second theoretical target positions and command the first and second tools to the desired spacing based upon the variance.

15. The assembly of claim 14, wherein the drive assembly includes a motor having a drive pulley and first and second driven pulleys respectively associated with the first and second arms, and a belt rotationally couples the drive pulley and the first and second driven pulleys.

16. The assembly of claim 14, wherein first and second actuators are provided respectively on the first and second arms and respectively support the first and second tools, the first and second actuators are configured to move the first and second tools in a z-direction.

17. The assembly of claim 16, wherein a slide assembly is provided between the first and second arms and its respective one of the first and second tools.

18. The assembly of claim 14, wherein the controller is configured to determine the variance by calculating a hypotenuse between each of the first and second cameras and its associated first and second actual target positions, wherein the hypotenuse corresponds to a focal direction of a camera, a first leg corresponds to a distance between the camera and a z-direction of a tool, and a second leg corresponds to a second distance along the z-direction.

19. The assembly of claim 18, wherein the end of arm tool assembly is mounted to a multi-axis robot, the controller in communication with the robot, and wherein the controller is configured to command the drive assembly to obtain the desired spacing in the y-direction, and the controller configured to command the robot to a desired position in the x-direction based upon the desired spacing.

* * * * *

UNITED STATES PATENT AND TRADEMARK OFFICE
CERTIFICATE OF CORRECTION

PATENT NO. : 10,987,809 B2
APPLICATION NO. : 17/010494
DATED : April 27, 2021
INVENTOR(S) : Brown et al.

Page 1 of 1

It is certified that error appears in the above-identified patent and that said Letters Patent is hereby corrected as shown below:

On the Title Page

Item (63), In the Related U.S. Application Data; replace "Oct. 24, 2019" with --Sept. 24, 2019--

Signed and Sealed this
Twenty-second Day of March, 2022

Drew Hirshfeld
*Performing the Functions and Duties of the*
*Under Secretary of Commerce for Intellectual Property and*
*Director of the United States Patent and Trademark Office*